(12) United States Patent
Schwarz

(10) Patent No.: US 8,106,773 B2
(45) Date of Patent: Jan. 31, 2012

(54) SYSTEM AND METHOD OF IDENTIFYING PRODUCTS ENCLOSED IN ELECTROSTATIC DISCHARGE PROTECTIVE PACKAGING

(75) Inventor: Horst Schwarz, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 229 days.

(21) Appl. No.: 11/480,764

(22) Filed: Jul. 3, 2006

(65) Prior Publication Data
US 2008/0001761 A1     Jan. 3, 2008

(51) Int. Cl.
G08B 13/14 (2006.01)
(52) U.S. Cl. ............... 340/572.1; 340/572.7; 340/572.8
(58) Field of Classification Search ............ 340/825.49, 340/572.1–572.9, 10.1–10.6
See application file for complete search history.

(56) References Cited

U.S. PATENT DOCUMENTS

| | | | | |
|---|---|---|---|---|
| 4,215,342 A * | 7/1980 | Horowitz | | 340/572.4 |
| 4,427,114 A * | 1/1984 | Howell et al. | | 206/707 |
| 5,387,900 A * | 2/1995 | Plonsky et al. | | 340/572.4 |
| 5,886,634 A * | 3/1999 | Muhme | | 340/572.1 |
| 6,243,265 B1 * | 6/2001 | Wong et al. | | 361/704 |
| 6,396,438 B1 * | 5/2002 | Seal | | 342/127 |
| 6,452,504 B1 * | 9/2002 | Seal | | 340/825.49 |
| 6,661,335 B1 * | 12/2003 | Seal | | 340/10.1 |
| 6,693,511 B1 * | 2/2004 | Seal | | 340/10.1 |
| 6,859,831 B1 * | 2/2005 | Gelvin et al. | | 709/224 |
| 6,922,173 B2 * | 7/2005 | Anderson | | 343/701 |
| 7,059,518 B2 * | 6/2006 | Forster | | 235/385 |
| 7,088,304 B2 * | 8/2006 | Endo et al. | | 343/788 |
| 7,256,695 B2 * | 8/2007 | Hamel et al. | | 340/572.1 |
| 7,273,173 B2 * | 9/2007 | Forster | | 235/385 |
| 7,295,108 B2 * | 11/2007 | Corrado et al. | | 340/539.22 |
| 7,299,987 B2 * | 11/2007 | Yoo et al. | | 235/472.01 |
| 7,466,232 B2 * | 12/2008 | Neuwirth | | 340/572.1 |
| 2003/0156033 A1 * | 8/2003 | Savage et al. | | 340/572.8 |
| 2004/0093265 A1 * | 5/2004 | Ramchandani et al. | | 705/14 |
| 2004/0113790 A1 * | 6/2004 | Hamel et al. | | 340/572.1 |
| 2004/0195319 A1 * | 10/2004 | Forster | | 235/385 |
| 2004/0203361 A1 * | 10/2004 | Belcher et al. | | 455/41.2 |
| 2004/0227682 A1 * | 11/2004 | Anderson | | 343/742 |
| 2005/0007296 A1 * | 1/2005 | Endo et al. | | 343/895 |
| 2005/0127156 A1 * | 6/2005 | Yoo et al. | | 235/375 |
| 2005/0253704 A1 * | 11/2005 | Neuwirth | | 340/539.13 |
| 2005/0253725 A1 * | 11/2005 | Neuwirth et al. | | 340/572.8 |

(Continued)

OTHER PUBLICATIONS

Todd Boone, The art of deplying RFID, Oct. 2004, Frontline Solutions, pp. 1-3.*
IBM, RFID Solutions, Using RFID technology within close proximityof IT systems and equipment, IBM, pp. 1-3.*
AEG ID Datenblatt Data Sheet—Glass ID 102/2; AEG Identifikationssyteme GmbH; Ulm, Germany; 2004.

(Continued)

Primary Examiner — Thomas Mullen
(74) Attorney, Agent, or Firm — Lempia Summerfield Katz LLC

(57) ABSTRACT

A system and method of identifying objects packaged in electrostatic discharge (ESD) protection packaging is disclosed. The system includes an ESD protection package and a radio frequency identification (RFID) tag. The RFID tag is affixed to the object prior to being inserted into the ESD protection packaging. A RFID interrogation device having a transmitter, an antenna and a receiver is used to interrogate the RFID tag and output the identification data to a display or to a computer. The method includes affixing an RFID tag to an object prior to placement in the ESD protection packaging, providing a RFID interrogation device including an antenna in proximity to the packaged object, and reading the data stored by the RFID tag for identifying the object.

15 Claims, 1 Drawing Sheet

U.S. PATENT DOCUMENTS

| | | | | |
|---|---|---|---|---|
| 2005/0258937 A1* | 11/2005 | Neuwirth | | 340/5.92 |
| 2005/0258956 A1* | 11/2005 | Neuwirth | | 340/539.13 |
| 2005/0280512 A1* | 12/2005 | Forster | | 340/10.34 |
| 2006/0192002 A1* | 8/2006 | Forster | | 235/385 |
| 2006/0215978 A1* | 9/2006 | Choy et al. | | 385/134 |
| 2006/0283945 A1* | 12/2006 | Excoffier et al. | | 235/439 |
| 2007/0262144 A1* | 11/2007 | Cargonja et al. | | 235/451 |
| 2007/0262868 A1* | 11/2007 | Westrick et al. | | 340/572.7 |
| 2007/0285248 A1* | 12/2007 | Hamel et al. | | 340/572.1 |

OTHER PUBLICATIONS

AEG ID Passive externe Antenne fur ARE I2 AAN X2F / AAN X2L; AEG Identifikationssyteme GmbH; Ulm, Germany; Oct. 2003.

AEG ID Stationary Compact Reader for PSK- or ASK-Transponder—ARE I2 / RS 232; AEG Identifikationssyteme GmbH; Ulm, Germany; Oct. 2003.

Buried Metal Product Specifications topshield—Static Shielding Material, Strobel GmbH; Langenzenn, Germany; Jan. 20, 2004.

* cited by examiner

SYSTEM AND METHOD OF IDENTIFYING PRODUCTS ENCLOSED IN ELECTROSTATIC DISCHARGE PROTECTIVE PACKAGING

TECHNICAL FIELD

The present application relates to a system and method of identifying a product enclosed in electrostatic discharge (ESD) protective packaging, and in particular to the use of radio-frequency identification (RFID) techniques.

BACKGROUND

Modern electronic products using, for example, semiconductor technology, are sensitive to high electric fields and currents, even though such fields and currents may be of a transitory nature. Degradation of performance or permanent damage to the devices is known to commonly occur unless the devices and products are properly protected during the course of production, storage, shipment, installation and use. For storage and shipment, various products, which may be termed ESD (electrostatic discharge) protective packaging, are used to minimize the possibility of damage. They may be used to wrap or bag the product, and may also include containers suitable for handling during typical factory or shipping operations.

ESD protective packaging typically has a characteristic that the surface or volume resistivity of at least a layer thereof is significantly lower than that exhibited by insulators which may be typical plastics, which may also comprise part of the packaging. The lower resistivity may be achieved, or example, by the use of special polymers, the loading of polymers with conductive materials such as metal or carbon, or the deposition of thin layers of metal on plastic. Often a combination of these techniques is used to minimize voltage build up due to triboelectric charging, or to shield the product from high electromagnetic fields or currents.

Identification of products and other items can be performed by the reading of bar codes using optical means and by the use of radio-frequency identification (RFID) to obtain information about a product using a non-contact automated technique. Such information may be used to sort products, inventory the products, retrieve products from storage or similar industrial uses. In particular, RFID is used to interrogate a device, often called a transponder or "tag" that has been affixed to the product or the package. A variety of different frequencies are used by RFID equipment depending on governmental regulations and may include operation in the LF, HF, UHF and microwave frequency ranges. LF and HF operation in the worldwide ISM (industrial, scientific and medical) allocations may be of an unlicensed type, with restrictions on the power used by the interrogating devices.

Items returned to a manufacturer or distributor may have RFID tags, and may also be protected by ESD bags or wrapping. It would be desirable to read the RFID tag without opening the box or container or the ESD bag in which the item was shipped.

When a passive RFID tag is used, the power required to operate the tag is provided by the electromagnetic fields generated and emitted by an antenna associated with the interrogation device. As such, any excess loss of power during the transit of an electromagnetic signal between the interrogation device and the tag will reduce the distance over which the interrogation of the RFID tag can be performed. Since many of the passive RFID tag systems are effective for a range of about a meter or less under ideal conditions, any substantial loss of signal strength may render the entire approach inoperative.

In particular, many types of ESD packaging, having layers of material which enclose the product and which may be conductive, will produce a shielding effect, sometimes known as a Faraday cage, and substantially attenuate the electric and magnetic fields of radiated electromagnetic waves. As such, it may not be possible to interrogate (or "read") the information on a RFID tag affixed to the product when the product is enclosed in ESD packaging. Even when the ESD packaging partially optically transparent, the reading of bar codes by optical means is difficult. Bar codes on the product would not be readable when the product in an ESD bag is enclosed by an outer shipping container such as a cardboard box.

SUMMARY

A system for identification of packaged products is described, including a radio frequency identification (RFID) tag affixed to an object to be identified; a electrostatic discharge (ESD) protection package; and an RFID interrogation device, or RFID reader. The object is enclosed in the ESD protection package and the RFID interrogation device operates at a low radio frequency.

A method of identifying an object in an electrostatic discharge (ESD) protection package is described, the method including: providing a radio frequency identification (RFID) tag capable of storing at least identification data associated with an object; attaching the RFID tag to, or associating the RFID tag with, the object and inserting the object in the ESD protection package. The method may further include providing a RFID interrogation device or reader having a transmitter, an antenna and a receiver; interrogating the packaged object; and at least one of displaying the object information as provided by the RFID tag or transferring the object information a computer data base.

DESCRIPTION

Figure 1:
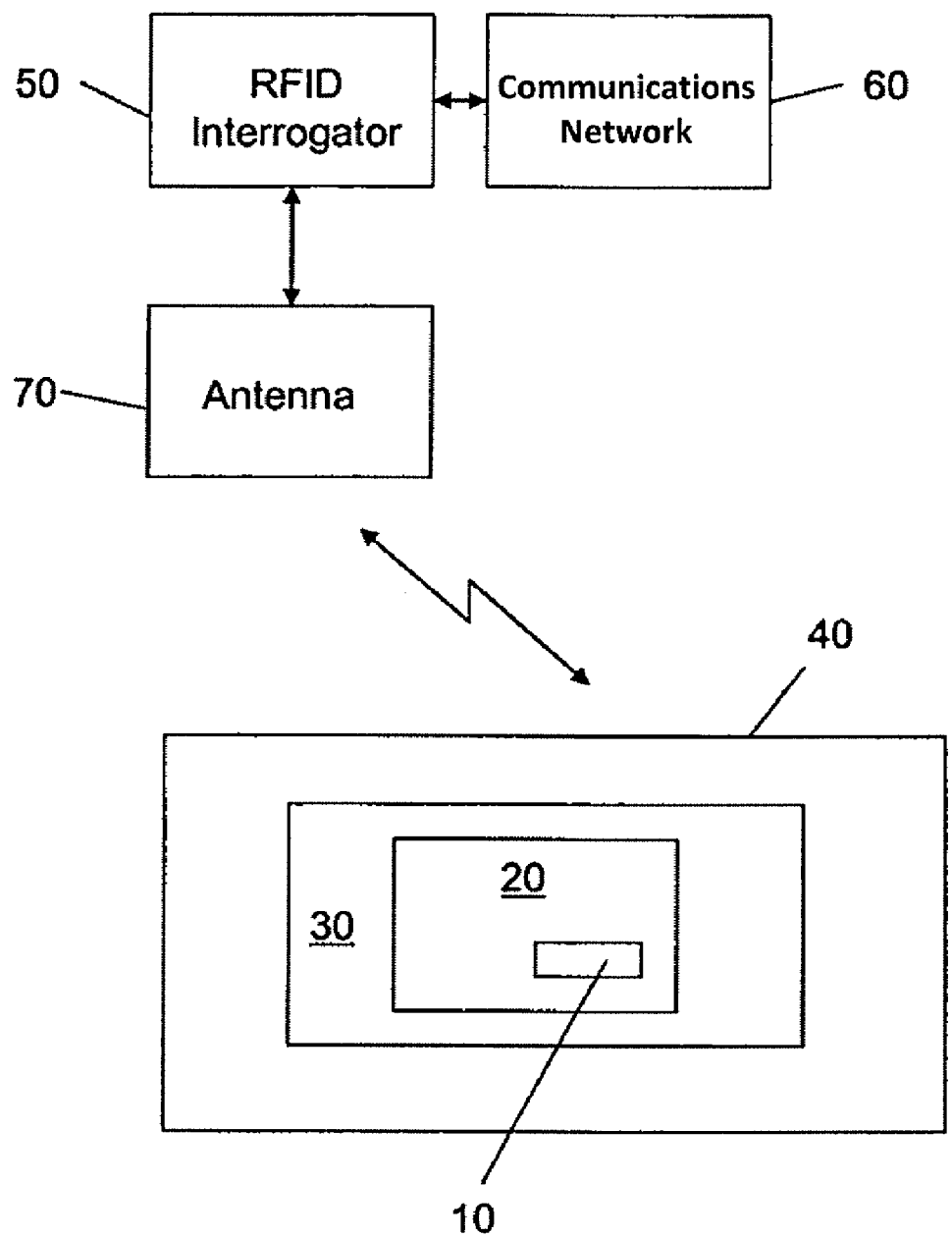
FIG. 1 shows a RFID identification tag enclosed in an ESD bag and packaging, being read by a RFID interrogation system.

Exemplary embodiments may be better understood with reference to the drawings, but these examples are not intended to be of a limiting nature. When a specific feature, structure, or characteristic is described in connection with an example, it will be understood that one skilled in the art may effect such feature, structure, or characteristic in connection with other examples, whether or not explicitly stated herein In the interest of clarity, not all the routine features of the implementations described herein are described. It will of course be appreciated that in the development of any such actual implementation, numerous implementation-specific decisions must be made to achieve specific goals, such as compliance with system and business related constraints, and that these goals will vary from one implementation to another.

The processing of a received signal may be by either analog or digital circuits, or a combination thereof. The signal processing may be also performed by one or more computers with associated memory and computer code which performs mathematical operations and functions equivalent to that performed by the analog or digital circuits. Herein, there is not intended to be a restriction of the type of circuit which performs each function, or the combination of types of circuits which may be used, although the examples may mention a specific type of circuit in the description thereof.

Where a computer or a digital circuit is used, the received signal may be converted from analog format to a digital representation thereof in an analog-to-digital (A/D) converter, as is known in the art. The A/D conversion process may be performed at any point after reception by the antenna. The choice of location of the A/D conversion will depend on the specific application.

Embodiments of this invention may be implemented in hardware, firmware, software, or any combination thereof, and may include instructions stored on a machine-readable medium, which may be read and executed by one or more processors. Data communications and processing modalities may include wired or wireless types, and the protocols for communications may be exemplified by TPC/IP transport and network layer protocols, or other standard protocols as may now exist or may be developed. Wireless communication means may include, audio, radio, lightwave or other technique not requiring a physical connection between a transmitting device and a corresponding receiving device.

Where the term "web" or "Internet" is used, the intent is to describe an internetworking environment, including both local and wide area networks, which may have both wired and wireless components, where defined transmission protocols are used to facilitate communications between diverse, possibly geographically dispersed, entities. An example of such an environment is the world-wide-web (WWW) and the use of the TCP/IP data packet protocol, and the use of Ethernet or other hardware and software protocols for some of the data paths.

A system and method of using a passive radio-frequency identification (RFID) tag 10 to provide identification of a product 20 enclosed in an electrostatic discharge (ESD) protection package or bag 30 is described. An RFID identification tag 10 is affixed to each individual item of a product 20 as a step in the manufacturing or packaging process. Alternatively, the RFID tag 10 may be associated with the product at the time of packaging in an ESD bag 30 by at least placing an RFID tag 10 in the bag 30 with the product 20.

The RFID tag may be of a read-only or read/write type and be of a size and durability appropriate to the product and use thereof. The frequency of operation of the interrogation signal is selected to be in the low radio frequency (LF) band, typically 120-150 kHz, but higher or lower radio frequencies may be used. The RFID tag may also have an optical bar code of any type corresponding to at least some of the information stored in the RFID tag, and may be verified at the time of packaging by at least one of optical or RFID methods. In an example, the RFID tag may respond to the interrogation signal on a frequency of about 62.5 kHz or other frequency differing from the interrogation signal frequency, and the system may operate in a full duplex mode.

The product with the attached RFID tag may be placed into an ESD protection bag and the bag is typically closed and may be sealed with a tape, a sliding closure or by heat sealing. Often, the bag is not opened again until the product is ready for use, such as by installing as a repair part, as an upgrade to a computer, or as part of a manufacturing operation performed after storage, transportation, or the like.

When a LF signal is used to interrogate the RFID tag, it has been experimentally determined, as described herein, that sufficient electromagnetic energy penetrates the ESD protection bag so that a useful signal is returned to the RFID sensor and that the data stored in the RFID tag may be read. The use of higher radio frequencies, such as high(HF)-, ultra-high (UHF)- and microwave frequencies is known not to yield useful data as the losses associated with the conductive or partially conductive nature of the ESD protection bag reduces the signal strength of the signal from the RFID tag such that it cannot be usefully detected.

The penetration of a conductive material by a electromagnetic wave is characterized by a parameter known as the "skin depth". This depth is associated with an attenuation of the incident signal such that the field has fallen to a factor of 1/e of the incident field. Since the electromagnetic signal must pass through the material on the incident and reflected portions of the path, the overall attenuation is proportional to $1/e^2$. The skin depth in conductive materials is proportional to $f^{1/2}$, and thus it is expected that low frequency (LF) signals will have greater skin depths that higher frequency signals and thus will experience lower attenuation in penetrating the ESD protection packaging. Where the term LF is used, it will be understood by persons of skill in the art that the formal band limits of 30 to 300 kHz are meant only approximately, as the $f^{1/2}$ dependence of the skin depth results in a slow variation of system performance with operating frequency. The actual operating frequencies chosen are usually constrained by governmental regulations.

In an aspect, shown in FIG. 1, a product 20, which may be an electronic circuit module or the like, having an RFID transponder tag 10 affixed thereto is inserted into an ESD protective bag 30. The bag may be further enclosed by a conventional cardboard or plastic container 40 for physical protection during storage and transportation, depending on the specific product and use.

A RFID interrogation device 50, comprising a transmitter and receiver and an antenna 70 is provided, where the frequency of operation is in the low frequency (LF) radio spectrum. The antenna 70 may be mounted in a table top (not shown), and connected to the RFID interrogation device 50 by a cable. The RFID interrogation device may be connected to one or more of a display, a local computer, or a communications network 60 to use the data obtained from the RFID tag 10.

Due to governmental regulations, the radio frequencies used may be restricted in order to avoid interference to other authorized users of the radio spectrum. Typically, authorized frequencies may be 125 kHz and 134 kHz, although other LF frequencies and possibly MF frequencies could be used if they subsequently become authorized. The transmitted power may also be limited in accordance with governmental regulations, which may also include safety considerations.

The signal transmitted by the antenna 70 impinges on the ESD protection bag 30 and a portion of the energy passes through the ESD protection bag 30 and interacts with the RFID tag 10. The RFID tag 10 responds by using the received energy to power the circuitry of the RFID tag 10 so as to impose a modulation on a signal that is radiated or reradiated by the RFID tag 10. The signal from the RFID tag penetrates the ESD protection bag and is received by the antenna of the interrogation device 50 and is demodulated by the receiver portion of the interrogation device. The modulation imposed on the signal radiated or re-radiated by the RFID tag 10 may represent data stored in the RFID tag 10 at a time prior to the interrogation time, and may be used to identify the part number or other attributes of the product. The other data, such as a serial number, manufacturing date, test results, and the like may be stored, depending on the specific use. The use of writable or rewritable RFID tags is more expensive, and the selection of RFID tag type may be an economic consideration.

Where a RFID tag has a read/write memory capable of multiple write operations, all or part of the data stored on in the RFID tag may be updated or changed.

The signal from the RFID tag received by the antenna of the interrogator is demodulated by the receiver portion thereof, and the resultant data may be displayed for an operator to view or use or transferred to a computer, communications system or data management system for further processing or storage, or to update an inventory listing.

The RFID tag 10 may be affixed to the product, module, or object 20 by gluing, clamping, or a loop passing through a hole in the item and in the RFID tag 10, or similar permanent or non-permanent means. For example, an RFID tag may be affixed to the object by "super glue", screws or bolts, or the insertion of the tag in a clip previously affixed to the object. The RFID tag may also be printed with an optical bar code representing some or all of the information contained in the RFID memory.

In an aspect, a pair of antennas 70 may be provided so that an antenna 70 may be disposed on either side of a package for transmitting and receiving the signals generated by the transmitter of the RFID interrogation device 50. Such a configuration may be effective in reading the RFID tag 10 when the tag is affixed to a metallic object and the thickness of the metallic object is such that increased attenuation results.

A method of identifying an item enclosed in an ESD protective bag includes the steps of: writing identifying information relating to an item of manufacture into the memory of a RFID tag or providing a RFID tag having such information previously incorporated therein; affixing the RFID tag to the item; packaging the item in an ESD protective material; locating the packaged item in the vicinity of a low frequency (LF) interrogation device; reading identifying information from the RFID tag. RFID tags may be mass produced with predetermined data that is associated with, or is, the product description, and these RFID tags are often used as they are less expensive than individually written RFID tags.

The method may further include displaying the identifying information read from the RFID tag, transmitting the information to a computer, a communications network or a data management system, and updating an inventory file.

The operation of the system and method was demonstrated by a series of informal tests performed under office conditions. In actual use, the antenna may be mounted in a tabletop having an opening cut in the top to expose the sensor antenna, and may have a dielectric surface disposed between the antenna and the object containing the RFID tag. The table top may be made out of a dielectric material. In the experiments, however, the packages were pulled or slid over the antenna surface. The goal of these experiments was to demonstrate that a low-frequency RFID tag may be read through an ESD bag and further external packaging. Generally, if the ESD bag was packaged in a container or box, it was determined that the box may have to be reoriented or flipped by 180 degrees in order to bring the RFID tag into closer proximity with the antenna in order for the tag to be read. Electronic circuit cards and a metal sheet were used as examples of products which may be packaged as described herein.

The ESD bags used were made of "topshield" static shielding material obtained from Strobel GmbH (Langenzenn, Germany) and are a laminate with, in order, anti-static, polyester, metal, polyethelene, and anti-static layers. The overall thickness was 2.9 mil. The metal layer had a surface resistivity of less than 100 ohms. The RFID tags used were glass-encapsulated read-only devices having a diameter of 2.12 mm and a length of 12 mm (part number ID102/2, obtained form AEG Identifikationssysteme GmbH, Ulm, Germany); the RFID tag reader was a model ARE 12/RS232 (obtained form AEG Identifikationssysteme GmbH, Ulm, Germany) and the antenna was a model AAN X2F (obtained form AEG Identifikationssysteme GmbH, Ulm, Germany).

A RFID transponder tag 10 was selected and test read by bringing the transponder into proximity with the antenna of the RFID interrogation device, and the ID number and the interrogation data recorded. A variety of typical electronic circuit cards were tested by affixing a RFID tag 10 thereto with cellophane tape or "super glue"; at least one of the samples was a metal sheet. The reading of data from the RFID tag was verified after this step in a manner similar to the first reading. The circuit cards, as examples of products, were introduced into ESD bags and the bags were closed, including folding the bags several times, and the folded bags were placed inside of cardboard boxes. Each of the samples was bought into proximity of the antenna 70 and reoriented if necessary to achieve a successful reading. The reading was repeated numerous times to verify successful performance. In the case of the metal sheet, it was sometimes found necessary to reorient the sample by 180 degrees so that the shielding effect of the thick metal was mitigated. This was also sometimes necessary with the printed circuit boards as well.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. A system for identification of packaged products, the system comprising:
    a passive radio frequency identification (RFID) tag affixed to or associated with an object to be identified;
    an electrostatic discharge (ESD) protection package; and
    an RFID interrogation device;
    wherein the object is enclosed in the ESD protection package, and the RFID interrogation device transmits at a low radio frequency to the object, and
    wherein the ESD protection package is oriented such that a first side of an exterior of the ESD protection package is oriented proximal to an antenna of the RFID interrogation device, and a second side of the exterior of the ESD protection package, opposed to the first side of the ESD protection package, is subsequently oriented proximal to the antenna.

2. The system of claim 1, wherein the low radio frequency is between approximately 120 kHz and approximately 150 kHz.

3. The system of claim 2, wherein the low radio frequency is approximately 125 kHz or approximately 134 kHz.

4. The system of claim 1, wherein the RFID interrogation device comprises a transmitter, an antenna and a receiver.

5. The system of claim 4, wherein the antenna comprises two antennas, each of the two antennas operable to transmit and receive low frequency signals and disposed such that the packaged object is insertable between the two antennas.

6. The system of claim 5, wherein an antenna of the two antennas comprises a first antenna and a second antenna, the first antenna operable to transmit signals and the second antenna operable to receive signals.

7. The system of claim 1, wherein the RFID interrogation device has a data interface configured to communicate with a computer, a telecommunications network, a visual display, or a combination thereof.

8. The system of claim 1, wherein the RFID tag has a read-only memory, a read/write-once memory, or a read/write memory.

9. The system of claim 1, wherein the RFID tag is configured to transmit at a low frequency.

10. The system of claim 9, wherein the low radio frequency of the RFID interrogation device and the low radio frequency of the RFID tag are the same low radio frequency.

11. The system of claim 1, wherein the RFID tag is affixed to the object by gluing, clamping, clipping, or tying.

12. A method of identifying an object in an electrostatic discharge (ESD) protection package, the method comprising:
 providing a passive radio frequency identification (RFID) tag operable to store at least identification data associated with the object;
 attaching the RFID tag to or associating the RFID tag with the object;
 inserting the object into the ESD protection package; and
 orienting the ESD protection package such that a first side of an exterior of the ESD protection package is oriented proximal to an antenna of an RFID interrogation device, and a second side of the exterior of the ESD protection package, opposed to the first side of the ESD protection package, is subsequently oriented proximal to the antenna,
 wherein the RFID tag is responsive to low radio frequencies.

13. The method of claim 12, further comprising:
 providing the RFID interrogation device, the RFID interrogation device having a transmitter, the antenna and a receiver;
 interrogating the packaged object; and
 at least one of displaying object information or transferring the object information to a computer data base.

14. The method of claim 13, wherein the transfer of object information to the computer data base is by transmission over a network.

15. The method of claim 13, further comprising updating an object inventory file in the computer data base.

\* \* \* \* \*